F. H. MILLS.
STOCK CHUTE.
APPLICATION FILED JAN. 12, 1909.
970,344.
Patented Sept. 13, 1910.
2 SHEETS—SHEET 1.
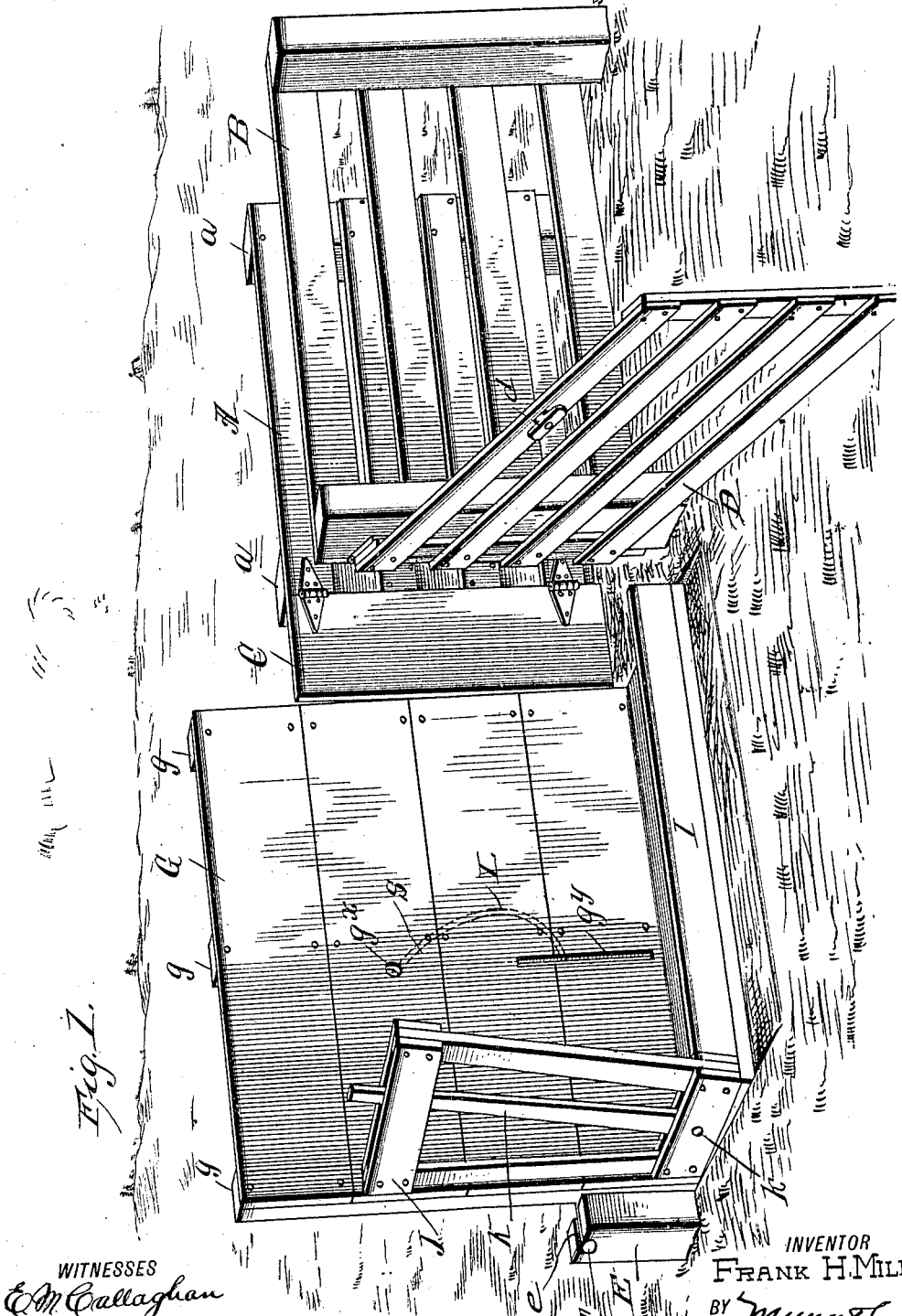
WITNESSES
E. M. Callaghan
L. A. Stanley
INVENTOR
Frank H. Mills
BY Munn & Co.
ATTORNEYS

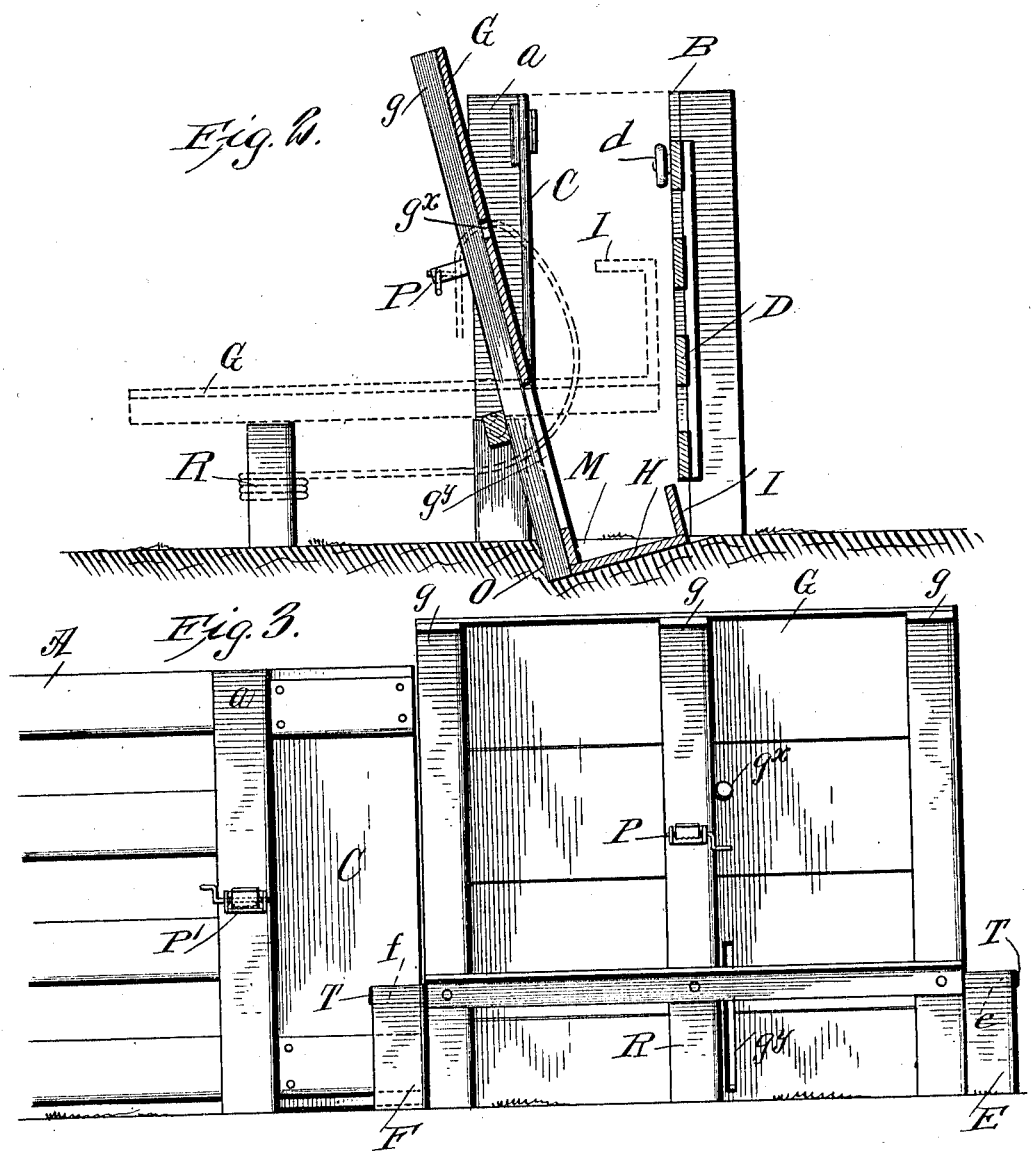

UNITED STATES PATENT OFFICE.

FRANK HOFFMAN MILLS, OF EDGEWOOD, CALIFORNIA.

STOCK-CHUTE.

970,344.  Specification of Letters Patent.  Patented Sept. 13, 1910.

Application filed January 12, 1909. Serial No. 471,856.

*To all whom it may concern:*

Be it known that I, FRANK H. MILLS, a citizen of the United States, and a resident of Edgewood, in the county of Siskiyou and State of California, have made certain new and useful Improvements in Stock-Chutes, of which the following is a specification.

My invention relates to improvements in devices for handling live stock with reference to branding, marking and castrating, and it consists in the constructions, combinations and arrangements hereinafter described and claimed.

The main object of my invention is to provide a device by which the animal may be securely held and thrown preparatory to branding. Ordinarily this is accomplished by means of a rope or lasso, the use of which results many times in choking the animal or in causing it to struggle so that it becomes overheated and wrought up so that in many cases the death of the animal ensues.

Another object of my invention is to provide a device which will permit the handling of live stock with the greatest despatch, thereby enabling a much larger number of animals to be handled in a given time than with the ordinary methods.

A further object of my invention is to provide novel means for securing the animals while these operations are being carried out.

Other objects and advantages will appear in the following specification and the novel features of the invention will be particularly pointed out in the appended claims.

My invention is illustrated in the accompanying drawings in which similar reference characters indicate like parts in the several views, in which—

Figure 1 is a perspective view showing one embodiment of my invention; Fig. 2 is a transverse vertical section through the device, and Fig. 3 is a rear view of the main portion of the apparatus.

In carrying out my invention I provide a straight approach or run-way formed by the fences A and B. This approach may be of any convenient length, but is preferably about twenty feet long. At one end of the fence A I provide a swinging gate C which is just the width of the runway, but which is adapted to swing between the two fences A and B to close the space between them. At the end of the fence B I provide a swinging gate D which has a cleat $d$ secured thereon.

On the same side as the fence A and in a line with the fence posts $a$ I provide the upright standards E and F having grooves $e$ and $f$ in their tops. Pivoted in these grooves is a frame which constitutes the main portion of my invention. This frame consists of a side portion G, which is constructed of boards secured to cross pieces $g$. The side member G is arranged to be normally in an inclined position as shown in Fig. 2. At one end of the side member G is a laterally projecting member H, which constitutes the bottom of a run-way as will be hereinafter explained. The bottom member H is provided with an upwardly extending rim I.

Secured at one end of the member G and the bottom member H is a stanchion J, which is provided with a movable member K pivoted at $k$ and guided between the two upper cross pieces of the stanchions. The member G is provided with an opening $g^x$ and with a slot $g^y$, through which a rope or cord L is arranged to pass, as shown in Fig. 1.

Referring now to Fig. 2, it will be seen that the member G, as stated before, is in a normally inclined position and that its lower end extends below the surface of the ground or below the supporting surface of the chute in case the latter should have a wooden or cement base, a portion of the supporting surface being excavated as shown at M to provide room for the end of the frame to enter and also fashioned to provide a stop O to limit the movement of the pivoted frame and to keep it normally in an inclined position, as shown in Fig. 2.

On the rear side of the central post $g$ of the frame I provide a clutch P, a similar clutch P' being provided on the rear of the supporting post $a$ of the fence A. The frame may be swung down into the position shown in dotted lines in Fig. 2 and may there be supported by a block R, which is of such a height as to hold the frame in a horizontal position, the member G then serving as a table.

From the foregoing description of the various parts of the device the operation thereof may be readily understood. The straight approach between the fences A and B may be filled with animals and closed, the gate C being swung over into contact with the fence B, while the gate D is swung into engagement with the stanchion J, to which it may be secured. The rope S is passed through the opening $g^x$ and through the slot $g^y$, one end being securely fastened to the rear supporting member R, while the other is passed through the clutch P, the loop thus formed on the front side of the table G is led along the bottom H and passed over the cleat $d$, being made large enough so that an animal can pass through it. When everything is in readiness for the branding operation, the gate C may be opened and one of the animals allowed to come into the chute between the gate D and the table G. Owing to the inclined bottom H the animal immediately bolts toward the stanchion J and as it does so the inclined surface causes it to lunge closely against the table G. When the animal reaches the end of the chute its head is secured by moving the lever K over in the ordinary manner. The loop is unfastened from the cleat D and the end of the rope passing through the clutch is now pulled until the animal is drawn securely upon the table. The hind feet of the animal are then secured by means of a foot rope which is held by the clutch P'. The gate D is now opened and a slight pressure on the upper end of the table G will cause it to revolve on its pivots T so that it can be let down into the position shown in Fig. 2. It will be seen that in this position the animal is in fact upon a platform or table at a convenient height for the branding operation. For spraying an animal the stop or support R may be removed and the frame revolved to an inclined position most convenient for the operation.

After the operation is over the frame is swung back into its normal position, the clutches holding the foot rope and the body rope are released and the animal will pass out through the gate opening, the gate D being already swung back for his exit.

It will thus be seen that I have provided a device in which an animal may be conveniently and quickly secured, thrown and operated upon. Moreover this device obviates the necessity of throwing an animal and dragging it around in the dust and dirt of the corral. In the use of the chute the animal is on a dirt-free platform and is gotten into position for the operation without the usual struggle. The location of the pivots is such that but slight pressure is required to tip the frame down into a horizontal position or to swing it upwardly, since the weight of the animal itself is but a short distance from the center of rotation.

I claim—

1. In a stock handling device, a run-way comprising parallel fences, a side gate pivoted to one of said fences, an operating table provided with a foot board and disposed opposite to said side gate, in line with one of said fences, a door pivoted to the last named fence, and arranged to swing into line with said table to constitute part of the run-way or to close the opening between the two fences, means on said table for securing an animal, and means for permitting the rotation of said table into an operative position.

2. In a stock handling device, a run-way comprising a side gate, an operating table provided with a foot board secured to said table opposite said side gate, a stanchion secured to said table and to said foot board and a gate for closing the central portion of said run-way, means for securing an animal to said table, and means for permitting the rotation of said stanchion, table and foot board into an operative position.

3. In a stock handling device, a run-way comprising a side gate and a frame, consisting of an operating table opposite said side gate being normally inclined slightly from the vertical, a foot board secured at right angles thereto, and a stanchion secured to said table and to said foot board, means for securing an animal to said table, and means for permitting the rotation of said frame and for supporting it in a horizontal position.

4. In a stock handling device, the combination with a run-way, of a chute combination a side gate and a frame consisting of an operating table opposite said side gate having a normal position slightly inclined from the vertical, a foot board secured to one edge of the table at right angles thereto, a stanchion secured at one end of said table and said foot board, means for securing an animal to said table, and pivots for permitting the rotation of said table into operating position.

5. In a stock handling device, a pivoted frame comprising an operating table having openings therethrough and having a normally inclined position from the vertical, a foot board secured to said table at right angles thereto, a clutch member secured to said table on the rear side thereof, a binding member arranged to be drawn through said clutch and openings for securing an animal to said table, means for holding the head of the animal, and a supporting member adapted to hold the table, means for permitting the rotation of said table into a horizontal position, and means for maintaining it in the horizontal position.

FRANK HOFFMAN MILLS.

Witnesses:
C. E. EVANS,
CLARENCE T. WENDELL.